Patented Sept. 28, 1948

2,450,123

UNITED STATES PATENT OFFICE 2,450,123

WHEAT GERM PREPARATION

Max P. Cryns, Kansas City, Mo., assignor, by mesne assignments, to Ira Milton Jones, Milwaukee, Wis.

No Drawing. Application April 19, 1939, Serial No. 268,730

6 Claims. (Cl. 99—153)

This invention relates to a food ingredient and a process of making the same, and refers particularly to an ingredient for use in baking and in the manufacture of confections like ice cream and certain candies.

In commercial baking practically all of the ingredients used are in a dry powdered state so that proper proportioning is more readily effected in making up a batch of dough. This is especially true in the baking of bread.

Included in these dry powder ingredients is powdered milk, and it is this ingredient with which the present invention deals. Powdered milk, of itself, does not have a very pleasant flavor; but it has been found that by combining it with a cereal, particularly wheat germ, the flavor of the powdered milk is materially improved with the result that baked goods and confections made with this improved powdered milk have a better flavor.

It has also been found that powdered milk made in accordance with this invention has higher moisture absorption characteristics than ordinary powdered milk so that baked goods and other edibles made with the new ingredient have better keeping qualities.

This invention thus seeks to provide an improved powdered milk suitable for baking and the manufacture of confections, and a commercially practical process of making the same.

With the above and other objects in view which will appear as the description proceeds, this invention resides in the novel product and process of producing it substantially as hereinafter described, and more particularly defined by the appended claims, it being understood that such changes in the precise embodiment of the herein-disclosed invention may be made as come within the scope of the claims.

The improved milk powder of this invention, strictly speaking, is a compound composed essentially of milk and cereal.

Just what takes place during the process of combining the cereal and milk has not been determined, but the results suggest that a new compound is created which has not only an improved flavor but also higher moisture absorption characteristics, good stability against rancidity and a valuable high vitamin content.

Any of the starchy cereals but that part of the wheat known as wheat germ which is removed in the milling of ordinary wheat flour, and wheat germ flour have been found to give especially good results. The wheat germ contains all of the valuable vitamins naturally present in wheat and combines admirably with sweet cream buttermilk, or skim milk to produce a culture rich in the flavor of wheat.

In making up a batch of the new material, using wheat germ flour and sweet cream buttermilk, the following ingredients are used substantially in the proportions stated:

| | Percent |
|---|---|
| Sweet cream buttermilk | 65 |
| Wheat germ flour | 30 |
| Lecithin | 2½ |
| Sugar | 2½ |

These ingredients are thoroughly mixed in any suitable manner, preferably by mechanical agitation, to form an emulsion which is then pumped or otherwise conveyed to suitable heating means such as a series of coils enclosed within a steam heated chamber where for approximately ten to fifteen seconds, it is heated to a temperature of approximately 160°.

As the emulsion flows through the heating means, a preliminary gelatinization takes place and while still at this temperature, it is sprinkled or otherwise deposited upon a heated roller. The roller, onto which the emulsion is deposited, is one of a pair between which the deposit is rolled under high pressure. Preferably, both of the rollers are heated to a temperature of approximately 300° to 325° F.

While on these drying rollers the emulsion is heated to a temperature of at least 200° F. and undergoes a radical change to give the product its predominantly sweet nut-like flavor, and the various substances unite to form a homogeneous integral structure or compound.

After being rolled into a very thin layer, the dehydrated compound is pulverized. It is then ready for use in baking and confectionary manufacture in exactly the same manner as ordinary powdered milk.

An an alternative to the process defined, the fluid cereal-milk emulsion may be dehydrated and pulverized by forcibly spraying it through a very fine orifice into a heated chamber or vessel. This spraying method of reduction is well known to the art of making powdered milk. With this process, as in the one previously described, the aqueous dispersion is heated to a temperature of at least 200° F.

Inasmuch as the milk-cereal compound produced in the manner described has a higher moisture absorption characteristic than ordinary powdered milk, being approximately one and one-half times as great, it follows that baked goods made with this new compound have better keeping qualities; and, as will be obvious, the improved flavor of the new compound as compared to ordinary powdered milk for which the new compound is substituted in the baking process, gives the baked goods a better flavor.

If desired, the wheat germ flour may be supplanted wholly by wheat germ, and skim milk may be substituted for the sweet cream buttermilk.

The lecithin performs an important function in promoting the desired combination of the cereal and milk.

Besides wheat germ flour, any starchy cereal may be employed, such as rye, rice, maize, barley, and oats; and as will be readily apparent the flavor of the finished product will be determined by the choice of the cereal.

When rye is used, the finished product takes the place of the sour dough culture in the baking of rye bread. In this instance, the process of preparing the compound is the same as described, but in place of sweet cream buttermilk, a cultured sour buttermilk is used, and the sugar is omitted. The proportions of the ingredients are thus—

|  | Percent |
|---|---|
| Cultured sour buttermilk | 65 |
| Rye flour | 32½ |
| Lecithin | 2½ |

These proportions and those given for the wheat culture are not critical, but have been found to give excellent results.

What I claim as my invention is:

1. A process of making a stabilized wheat germ preparation which comprises combining finely divided wheat germ with a relatively small amount of milk-solids-not-fat dispersed in water and then concentrating, said aqueous dispersion having been heated during processing to a temperature of at least 200° F.

2. A process of making a stabilized wheat germ preparation which comprises dispersing wheat germ in finely divided condition in aqueous milk-solids-not-fat, gelatinizing the aqueous dispersion by heating the same to a temperature of approximately 160° F., and then drying the gelatinized dispersion, the milk-solids-not-fat being present in a relatively small amount as the stabilizing agent.

3. A stabilized wheat germ preparation containing a small proportion of milk-solids-not-fat and a large proportion of wheat germ on their solids weight basis, said wheat germ and milk-solids-not-fat having been heated during processing and while in a dispersed aqueous condition to a temperature of at least 200° F. whereby the preparation is substantially stabilized against oxidative deterioration.

4. A dried stabilized wheat germ preparation containing a minor proportion of skim milk and a major proportion of wheat germ on their solids weight basis, said wheat germ and skim milk having been heated during processing and while in a dispersed aqueous condition to a temperature of at least 200° F. whereby the preparation is substantially stabilized against oxidative deterioration.

5. A process of making a stabilized wheat germ preparation which comprises dispersing finely divided wheat germ in aqueous skim milk to form an emulsion in which the wheat germ predominates on a solids weight basis, heating said aqueous wheat germ-skim milk emulsion to approximately 160° F., and thereafter drying the emulsion.

6. A process of making a stabilized wheat germ preparation which comprises dispersing wheat germ in finely divided condition in aqueous skim milk in such relative proportions that the mixture contains a greater proportion of wheat germ solids than skim milk solids, heating the preparation to a temperature of approximately 160° F. and thereafter drying the aqueous mixture by heating it to a temperature of at least 200° F.

MAX P. CRYNS.

REFERENCES CITED

The following references are of record in the file of this patent:

UNITED STATES PATENTS

| Number | Name | Date |
|---|---|---|
| 1,431,938 | Dunham | Oct. 17, 1922 |
| 1,631,023 | Feldhusen | May 31, 1927 |
| 2,198,216 | Musher | Apr. 23, 1940 |
| 2,198,218 | Musher | Apr. 23, 1940 |

FOREIGN PATENTS

| Number | Country | Date |
|---|---|---|
| 15,471 | Great Britain | 1896 |
| 50,144 | Denmark | Apr. 15, 1935 |
| 57,625 | Norway | Feb. 15, 1937 |